(12) United States Patent
Kim et al.

(10) Patent No.: US 7,890,779 B2
(45) Date of Patent: Feb. 15, 2011

(54) METHOD AND APPARATUS FOR PROVIDING UPDATED INFORMATION USING POWER CONTROL IN PORTABLE TERMINAL DEVICE

(75) Inventors: Joung-youl Kim, Seoul (KR); Hong-sam Kim, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 667 days.

(21) Appl. No.: 11/872,807

(22) Filed: Oct. 16, 2007

(65) Prior Publication Data

US 2008/0178013 A1 Jul. 24, 2008

(30) Foreign Application Priority Data

Jan. 22, 2007 (KR) .................. 10-2007-0006696

(51) Int. Cl.
*G06F 1/00* (2006.01)
*G06F 1/26* (2006.01)
*G06F 15/16* (2006.01)
*G06F 15/177* (2006.01)
*G08B 21/00* (2006.01)
*G08C 17/00* (2006.01)
*H04H 20/71* (2008.01)
*H04B 1/16* (2006.01)
*H04W 4/00* (2009.01)

(52) U.S. Cl. .................. 713/300; 713/320; 340/636.1; 370/311; 455/3.01; 455/343.1; 455/422.1; 455/574; 709/219; 709/220; 709/222

(58) Field of Classification Search ............... 713/1, 713/100, 300, 320; 709/219, 220, 222; 455/3.01, 455/343.1, 422.1, 574; 370/311; 340/636.1
See application file for complete search history.

(56) References Cited

U.S. PATENT DOCUMENTS

| 6,289,464 | B1   |   | 9/2001  | Wecker et al. |
| 7,440,781 | B2   | * | 10/2008 | Beach et al. ................. 455/574 |
| 7,593,709 | B2   | * | 9/2009  | Chen ........................ 455/343.1 |
| 7,624,393 | B2   | * | 11/2009 | Egan et al. ................... 717/173 |
| 2006/0069769 | A1 | * | 3/2006  | Dacosta ....................... 709/224 |
| 2007/0190963 | A1 | * | 8/2007  | Ananthanarayanan et al. ... 455/343.1 |

FOREIGN PATENT DOCUMENTS

| JP | 2002-57617 | 2/2002 |
| KR | 2006-66709 | 6/2006 |

* cited by examiner

*Primary Examiner*—Stefan Stoynov
(74) *Attorney, Agent, or Firm*—Staas & Halsey LLP

(57) ABSTRACT

A method of providing updated information using power control in a portable terminal device. The method includes connecting to a server periodically by supplying power at predetermined time intervals; determining whether or not updated information exists in the connected server; and according to a result of determining, selectively outputting the updated information on a predetermined basis when the updated information is determined to exist in the connected server.

22 Claims, 4 Drawing Sheets

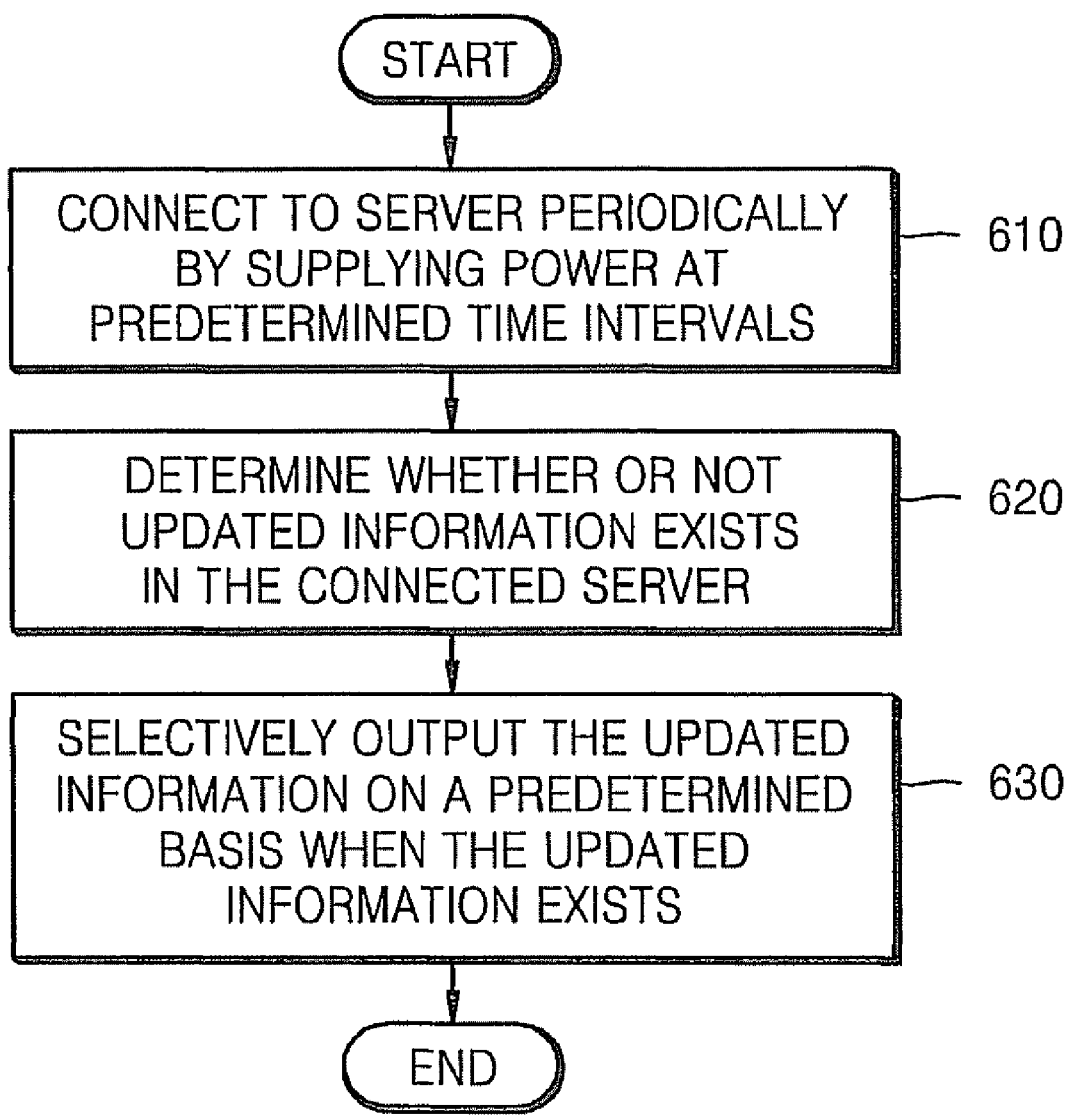

METHOD AND APPARATUS FOR PROVIDING UPDATED INFORMATION USING POWER CONTROL IN PORTABLE TERMINAL DEVICE

CROSS-REFERENCE TO RELATED APPLICATIONS

This application claims the benefit of Korean Patent Application No. 2007-6696, filed in the Korean Intellectual Property Office on Jan. 22, 2007, the disclosure of which is incorporated herein by reference.

BACKGROUND OF THE INVENTION

1. Field of the Invention

Aspects of the present invention relate to a method and apparatus for providing updated information using power control in a portable terminal device.

2. Description of the Related Art

WiBro is the abbreviation for Wireless Broadband Internet. WiBro is a super high speed Internet service for connecting to the Internet using a portable terminal whenever and wherever at a high transmission speed of about 1 Mbps. WiBro can be used while the portable terminal is at rest or in motion. With WiBro, the concept of an indoor wired super high speed Internet service is extended to a wireless service that can be used during movement.

FIG. 1 illustrates a structure of a communication system in a WiBro network. The WiBro network includes a plurality of cells 100 and 150, base stations 110 and 140 for managing the cells 100 and 150, and a number of mobile subscriber stations (MSSs) 111, 113, 130, 151, and 153. Signal transmission/reception between the base stations 110 and 140 and the MSSs 111, 113, 130, 151, and 153 is performed using an orthogonal frequency division multiplexing (OFDM) method and/or an orthogonal frequency division multiple access (OFDMA) method. The MSS 130 is placed in a border area. Mobility for the MSSs 111, 113, 130, 151, and 153 can be supported only when a handover for the MSS 130 is supported.

Power consumption of the MSS is an important factor over the entire system. In order to minimize the power consumption of the MSS, a sleep mode, an awake mode, and an idle mode between the MSS and the base station is proposed.

FIG. 2 illustrates operation modes supported by a WiBro communication network. The WiBro communication network supports several operating modes: a null mode 210, a standby mode 220, an awake mode 230, a sleep mode 240, and an idle mode 250. The null mode 210 and the standby mode 220 are operating modes used when the portable terminal device is not connected to the WiBro network. The awake mode 230, the sleep mode 240, and the idle mode 250 are operating modes used when the portable terminal device is in the WiBro network.

The null mode 210 is a state where the portable terminal device is turned off. The standby mode 220 is a mode for attempting to connect to the WiBro network by supplying power to the portable terminal device. The awake mode 230 is a mode in which a user can connect to the Internet and perform retrieval, upload, and download. The sleep mode is a minimum power state where only an Internet protocol (IP) is maintained by transmitting minimum information on the portable terminal device to a system for periodically managing the WiBro network. The idle mode 250 is a state where the power to the portable terminal device is turned off but the IP is not registered.

As described above, in the related art, data cannot be sent through the network while the portable terminal device is in the sleep mode. In order to communicate data, the sleep mode has to be changed to the awake mode so as to turn on the portable terminal device. As a result, power consumption of the portable terminal device cannot be effectively controlled.

SUMMARY OF THE INVENTION

Aspects of the present invention provide a method and apparatus for providing updated information using power control in a portable terminal device capable of effectively controlling power consumption.

According to an aspect of the present invention, a method of providing updated information using power control in a portable terminal device is provided. The method comprises connecting to a server periodically by supplying power at predetermined time intervals; determining whether or not updated information exists in the connected server; and selectively outputting the updated information on a predetermined basis when the updated information is determined to exist in the connected server.

According to another aspect of the present invention, the predetermined basis may be determined based on a type of the updated information, a source of the updated information, an importance of the updated information, an urgency of the updated information, and remaining power of the portable terminal device.

According to another aspect of the present invention, the power is supplied only to components needed to perform operations in the connecting to the server, the determining of whether or not the updated information exists, and the outputting of the updated information.

According to another aspect of the present invention, the determining includes receiving predetermined information from the server when the server is connected; and comparing the received information with information previously received.

According to another aspect of the present invention, the predetermined information may be information received from one or more web sites.

According to another aspect of the present invention, the outputting of the updated information comprises displaying the updated information or a message indicating the presence of the updated information on a screen.

According to another aspect of the present invention, the outputting of the updated information includes performing an alarm function using sound or vibration when the updated information exists.

According to another aspect of the present invention, the outputting of the updated information comprises storing the updated information.

According to another aspect of the present invention, the outputting of the updated information comprises transmitting the updated information to another device connected to the portable terminal device.

According to another aspect of the present invention, the transmission may be performed wired or wirelessly.

According to another aspect of the present invention, the power of the portable terminal device may be controlled by software programmed to control the power.

According to another aspect of the present invention, a portable terminal device is provided to provide updated information using power control. The portable terminal device comprises a power control unit to control power supplied to the portable terminal device; a communication module to periodically connect to a server at predetermined time intervals based on the power control of the power control unit; a determination unit to determine whether or not updated information exists in the connected server; and an information provider to selectively output the updated information on a predetermined basis when the updated information exists according to a result of the determination unit.

According to another aspect of the present invention, the power control unit supplies the power only to components needed to perform operations of the communication module, the determination unit, and the information provider.

According to another aspect of the present invention, the determination unit comprises a receiver to receive predetermined information from the server when the server is connected by the communication module; and a comparator to compare the received information with previously received information.

According to another aspect of the present invention, the information provider comprises an output unit to output the updated information or a message indicating the presence of the updated information.

According to another aspect of the present invention, the information provider comprises an alarm unit to perform an alarm function using sound or vibration when the updated information is determined to exist.

According to another aspect of the present invention, the portable terminal device further comprises a storage unit to store the updated information when the updated information exists.

According to another aspect of the present invention, the storage unit is one or more of a RAM (random-access memory), a hard disk, and a flash memory.

According to another aspect of the present invention, the portable terminal device may further include software programmed to perform the power control.

According to another aspect of the present invention, there is provided a computer-readable medium having embodied thereon a computer program that, when executed by a portable computer device, causes the portable terminal device to perform the method of providing updated information using power control.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 6 is a flowchart of a technique of providing updated information using power control in a portable terminal device according to an embodiment of the present invention.

DETAILED DESCRIPTION OF THE EMBODIMENTS

Figure 1:
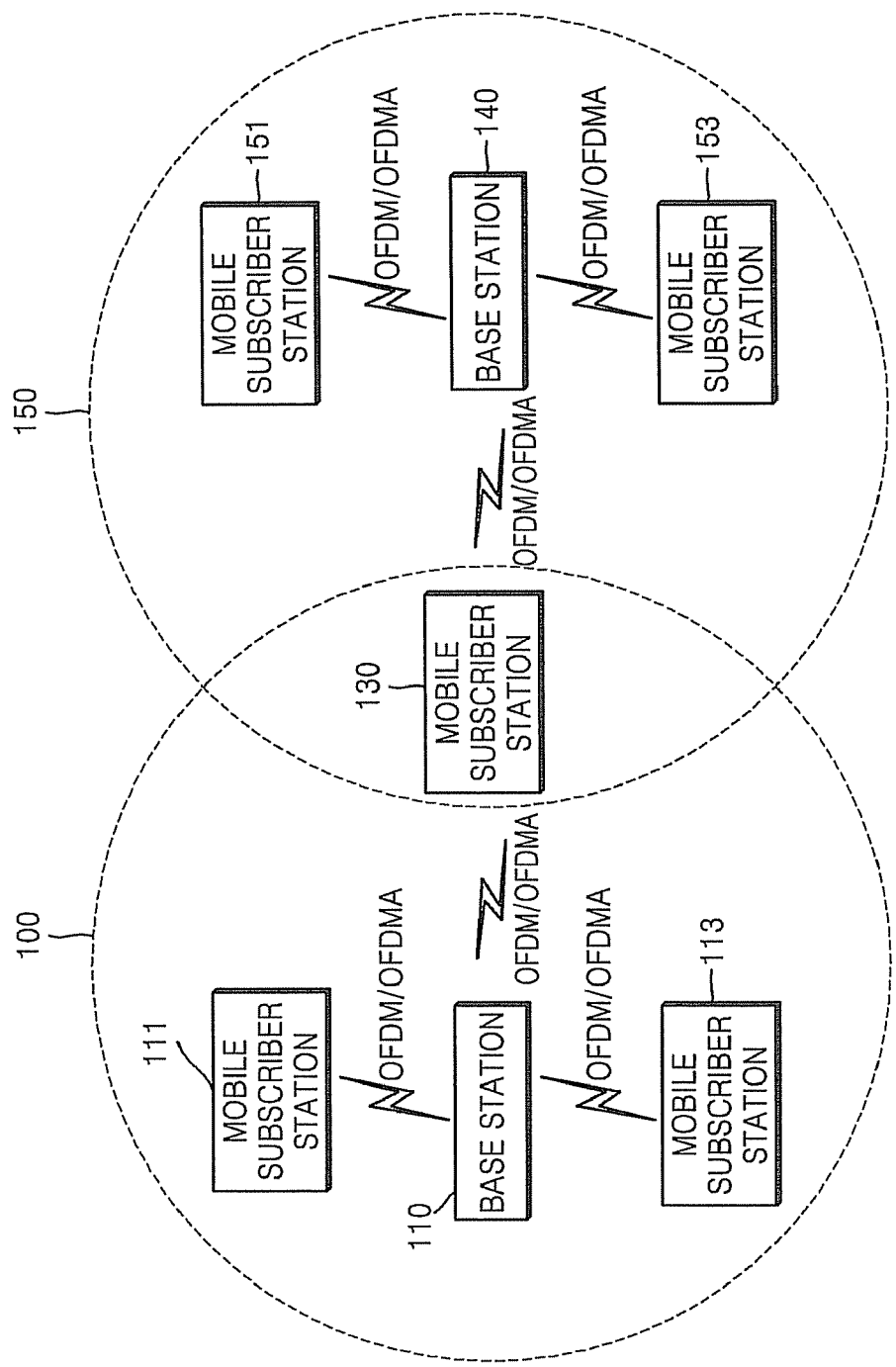
FIG. 1 is a view explaining a structure of a communication system in a Wireless Broadband (WiBro) network.
Figure 2:
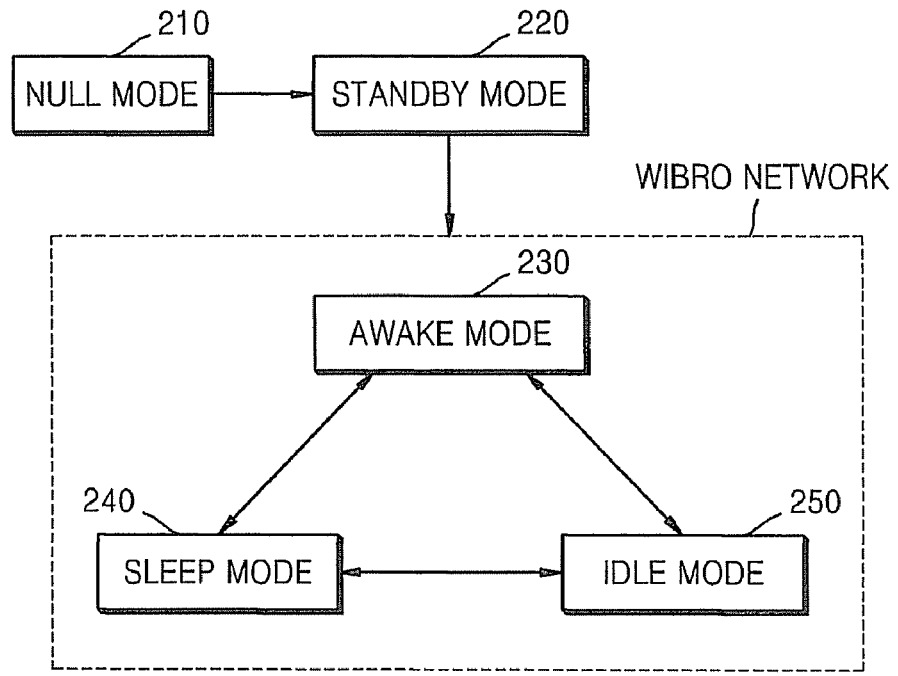
FIG. 2 illustrates operation modes supported by the WiBro communication network.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 3:
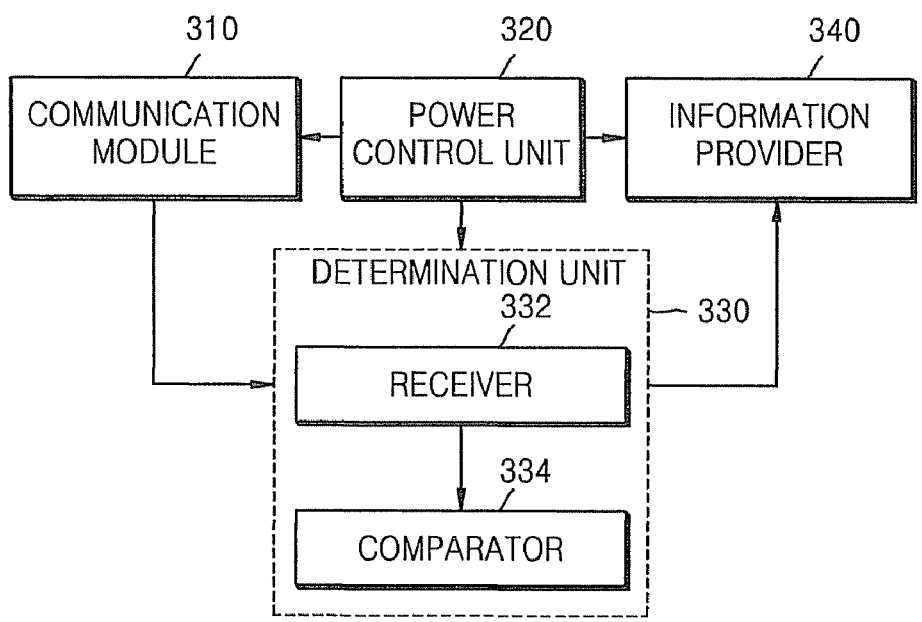
FIG. 3 illustrates a portable terminal device for providing updated information using power control according to an embodiment of the present invention.

FIG. 3 illustrates a portable terminal device for providing updated information using power control according to an embodiment of the present invention. The portable terminal device includes a communication module 310, a power control unit 320, a determination unit 330, and an information provider 340. The portable terminal device may be a portable computer, mobile phone, personal digital assistant, digital camera, MP3 player, personal entertainment device, etc.

The communication module 310 periodically connects to a server at predetermined time intervals based on power control performed by the power control unit 320. The communication module 310 connects to the server through a wireless network. Examples of wireless networks include Wi-Fi and a wireless broadband network such as WiBro. The communication module 310 may connect to the server through the WiBro network at intervals of 5 minutes or 10 minutes.

The power control unit 320 controls the supply of power to the portable terminal device according to whether or not the communication module 310 connects to the server. The power control unit 320 may be called a Micom according to an implementation example. When the portable terminal device does not connect to the server, the power control unit 320 does not supply power to the portable terminal device. The power control unit 320 may control the power by supplying power to the portable terminal device only when the server is connected. The power control unit 320 may supply power only to components of the portable terminal device needed to perform a predetermined operation.

A general power control mode in the portable terminal device including first to fifth modes is explained as follows. The first mode is a state where all the components of the portable terminal device receive power and power consumption of a central processing unit (not shown) controlling the portable terminal device is at a maximum. The second mode is a state where the all of the components receive power as in the first mode, but the central processing unit is in a power saving mode state so that the power consumption of the central processing unit is less than that of the first mode.

The third mode is a state where power is supplied only to the power control unit 320 and a memory (not shown) for storing information including work of the user, for example, a random-access memory (RAM). The portable terminal device can return immediately to the first or second mode from the third mode if required. The third mode may be likened to a state where a screen saver of a personal computer is operating.

The fourth mode is a state where the power is supplied only to the power control unit 320 and a hard disk (not shown) to store information. Although the portable terminal device can return to the first or second modes from the fourth mode, this process may take a long time. The fourth mode may be likened to a state where, if power is suddenly turned off while word processing in the personal computer and the power is turned on again, the document being worked on is restored. The fifth mode is a state where the power is supplied only to the power control unit 320 in the portable terminal device. The portable terminal device cannot be returned to the first or second mode while in the fifth mode.

In the power control mode described above, the first and second modes correspond to the awake mode supported by the WiBro communication network. The third to fifth modes correspond to the WiBro sleep mode.

The power control unit 320 can perform power control to supply power only to components of the portable terminal device needed to perform a predetermined operation in addition to the power control according to the general power control mode described above. For example, when the portable terminal device connects to the server, the power control unit 320 may control the power by supplying power only to the communication module 320 while controlling the power in one of the third through fifth modes.

Otherwise, the power control unit 320 may control the power on the basis of current remaining power of the portable terminal device. For example, when the remaining power of the portable terminal device is less than a critical value, the power can be controlled by the fourth or fifth mode and not the third mode. Power may also be supplied to the communication module at predetermined time intervals instead of continuously.

According to aspects of the present invention, power is supplied only to the components needed to perform the predetermined operation, so that the power consumption of the portable terminal device can be reduced.

Generally, while the portable terminal device is operating in one of the third, fourth, or fifth modes, power is supplied only to the power control unit 320, the memory, or the hard disk such that external communication is impossible. However, according to aspects of the present invention, in order to perform external communication while the portable terminal device is operating in these modes, the power is supplied to the needed devices (such as the communication module 310), enabling external communication.

The power control unit 320 according to other aspects of the present invention may control the power using software programmed to perform the power control. The power control unit 320 may further include a power control switch (not shown) to supply power for the components of the portable terminal device as to control power more stably. For example, the power control unit 320 may perform only the power control corresponding to the first through fifth modes, and the power control switch may perform only the power control for the components needed to perform the predetermined operation.

When the user does not want the power control according to aspects of the present invention, the power is controlled according to the general power control mode and the portable terminal device operates in one of the first to fifth modes. However, as described above, external communication is impossible when the portable terminal device is operating in the third, fourth, or fifth modes of the general control mode.

The portable terminal device according to aspects of the present invention may further include a power control selector (not shown) to allow the user to select the power control.

The determination unit 330 includes a receiver 332 and a comparator 334. The receiver 332 receives predetermined information from the server when the server is connected by the communication module 310. The predetermined information may be received from a web site. The user may set in advance a plurality of web sites and receive information from the set web sites. For example, the user may receive information from a blog, news page, a stock web site, an electric program guide (EPG) for mobile Internet protocol television (IPTV), moving image list information on video on demand (VOD), or information from a voice over Internet protocol (VoIP) service.

The comparator 334 compares the received information with previously received information. The comparator 334 compares information newly received from a web site set in advance with information previously received from the web site in order to determine whether updated information exists. The portable terminal device may further include a storage unit (not shown) to store the information. The storage unit may be RAM, a hard disk, or a flash memory.

The information provider 340 selectively outputs the updated information on a predetermined basis. The predetermined basis may be determined based on a type of the updated information, a source of the updated information, an importance of the updated information, an urgency of the updated information, and the residual power of the portable terminal device.

Figure 4:
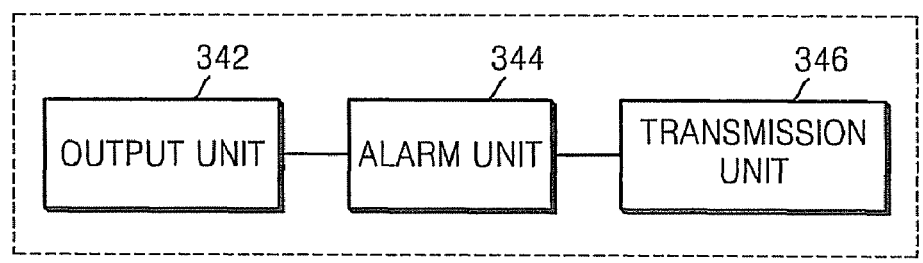
FIG. 4 is a detailed view showing an information provider according to an embodiment of the present invention.

FIG. 4 is a detailed view showing the information provider 340 according to an embodiment of the present invention. The information provider 340 includes an output unit 342, an alarm unit 344, and a transmission unit 346.

The output unit 342 outputs the updated information or a message to indicate the presence of the updated information to a screen of the portable terminal device based on the type, the source, the importance, and the urgency of the updated information. For example, the information provider 340 may check the type, the source, the importance, and the urgency of the updated information. When the user sets the portable terminal device to output the updated information, the output unit 342 outputs the updated information on the screen of the portable terminal device. Otherwise, only the message indicating the presence of the updated information may be displayed on the screen.

The alarm unit 344 outputs an alarm using sound or vibration when the updated information exists. When the output unit 342 outputs the updated information or the message indicating the presence of the updated information on the screen, the alarm unit 344 may output an alarm to inform the user of the message or the updated information.

The transmission unit 346 transmits the updated information to another device connected to the portable terminal device on a predetermined basis when the updated information exists. For example, when the remaining power of the portable terminal device is greater than or equal to a critical value, the information provider 340 outputs the updated information or the message indicating the presence of the updated information through the output unit 342. When the remaining power of the portable terminal device is less than the critical value, the information provider 340 allows the transmitter 346 to transmit the updated information to another device connected to the portable terminal device.

Figure 5:
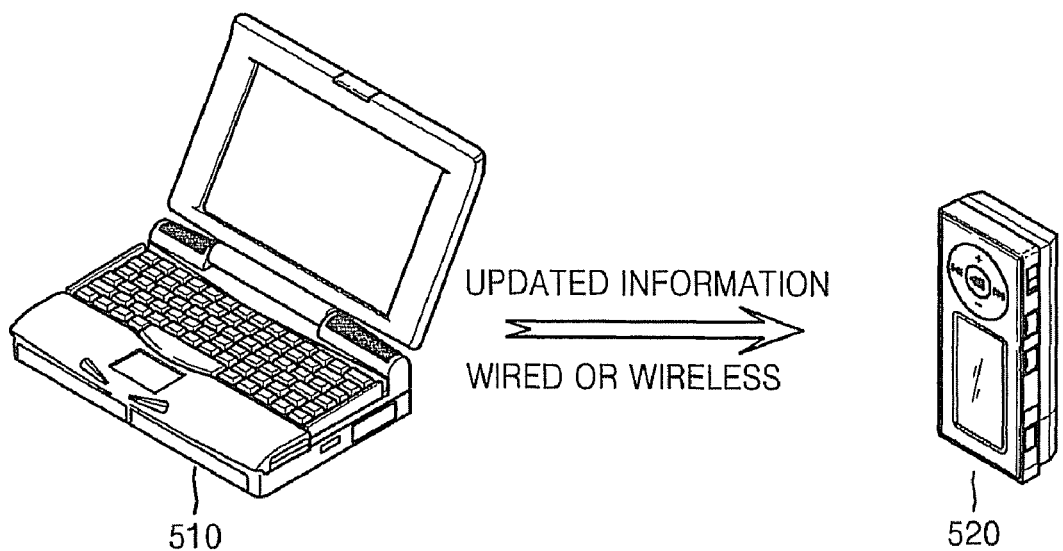
FIG. 5 illustrates operations of a transmission unit according to an embodiment of the present invention.

FIG. 5 is a view showing operations of a transmission unit according to an embodiment of the present invention. A notebook 510 transmits the updated information to a portable MP3 player 510. The notebook 510 and MP3 player 520 are examples of portable terminal devices.

A reason why the updated information is transmitted to the MP3 player 520 is that outputting the updated information on the notebook 510 consumes power of the notebook 510. To conserve power, the updated information transmitted from the notebook 510 is output to the MP3 player 520. The transmission unit 346 may transmit the updated information in a wired or wireless network. For the wireless transmission, a Bluetooth, Wi-Fi, WiBro, or other wireless network may be used. The message indicating the presence of the updated information may be transmitted along with the updated information. If the information provider 340 is set to store the updated information in the storage unit, or the user cannot check the updated information in real-time, the updated information may be stored in the storage unit.

For example, if the updated information is received from a VoIP service, and the user does not want to check the received information in real-time so as to set the information provider 340 to store the received information in the storage unit, or if the user is not in a VoIP service area and the user cannot check the received information in real-time, then the received information may be stored in the storage unit. The user can check the received information stored in the storage unit at a later time. Once the user reads the message indicating the presence of the updated information, the user may obtain the updated information by directly connecting to a web site having the updated information.

The portable terminal device may be set to connect to the web site including the updated information when a predetermined button is pressed. For example, if the updated information is the received information of the VoIP service, the user may call by directly inputting the received number. If the portable terminal device is set to call to a newly received number when a predetermined button is clicked, the user may click the predetermined button to connect to the newly received number.

FIG. 6 is a flowchart of a technique of providing updated information using power control in the portable terminal device according to an embodiment of the present invention.

In operation 610, the portable terminal device periodically connects to the server by supplying power at predetermined time intervals. The power control unit 320 may supply power to all the components of the portable terminal device at intervals of 5 minutes or 10 minutes and may supply power only to the components needed to perform a predetermined operation. In order to reduce power consumption of the portable terminal device, the power control unit 230 may control the power according to the third, fourth, or fifth modes and supply power only to the needed components. For example, the power control unit 230 may, in operation 610, apply the power only to the communication module 310.

In operation 620, it is determined whether or not updated information exists in the connected server. If the updated information exists, the updated information is selectively output on a predetermined basis in operation 630. The predetermined basis may be determined based on the type of the updated information, the source of the updated information, the importance of the updated information, the urgency of the updated information, and the remaining power of the portable terminal device.

According to aspects of the present invention, power is supplied periodically at predetermined time intervals to connect the server, it is determined whether or not updated information exists in the connected server, and when the updated information exists, the updated information is selectively output on a predetermined basis, so that it is possible to effectively control the power consumption of the portable terminal device.

Power control techniques according to aspects of the present invention may be recorded in non-transitory computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CDs and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of providing updated information using power control in a portable terminal device, the method comprising:
    entering a sleep mode;
    connecting to a server periodically by supplying power at predetermined time intervals;
    determining whether updated information exists in the connected server; and
    selectively outputting the updated information on a predetermined basis when the updated information is determined to exist in the connected server,
    wherein the power is supplied only to components needed to perform operations in the connecting to the server, the determining of whether the updated information exists, and the outputting of the updated information, while in the sleep mode.

2. The method of claim 1, wherein the predetermined basis is determined based on a type of the updated information, a source of the updated information, an importance of the updated information, an urgency of the updated information, and remaining power of the portable terminal device.

3. The method of claim 1, wherein the determining comprises:
    receiving predetermined information from the server when the server is connected; and
    comparing the received information with information previously received.

4. The method of claim 3, wherein the predetermined information is information received from one or more web sites.

5. The method of claim 1, wherein the outputting of the updated information comprises displaying the updated information or a message indicating the presence of the updated information on a screen.

6. The method of claim 1, wherein the outputting of the updated information comprises performing an alarm function using sound or vibration when the updated information exists.

7. The method of claim 1, wherein the outputting of the updated information comprises storing the updated information.

8. The method of claim 1, wherein the outputting the updated information comprises transmitting the updated information to another device connected to the portable terminal device.

9. The method of claim 8, wherein the transmission is performed wired or wirelessly.

10. The method of claim 1, wherein the power of the portable terminal device is controlled by software programmed to control the power.

11. A portable terminal device to provide updated information using power control, the portable terminal device comprising:
    a power control unit to control power supplied to the portable terminal device and enter a sleep mode;

a communication module to periodically connect to a server at predetermined time intervals based on the power control of the power control unit;

a determination unit to determine whether updated information exists in the connected server; and an information provider to selectively output the updated information on a predetermined basis when the updated information exists according to a result of the determination unit, wherein the power control unit supplies power only to components needed to perform operations of the communication module, the determination unit, and the information provider, while in the sleep mode.

12. The portable terminal device of claim 11, wherein the predetermined basis is determined based on a type of the updated information, a source of the updated information, an importance of the updated information, an urgency of the updated information, and remaining power of the portable terminal device.

13. The portable terminal device of claim 11, wherein the determination unit comprises:

a receiver to receive predetermined information from the server when the server is connected by the communication module; and a comparator to compare the received information with previously received information.

14. The portable terminal device of claim 13, wherein the predetermined information is information received from one or more web sites.

15. The portable terminal device of claim 11, wherein the information provider comprises an output unit to output the updated information or a message indicating the presence of the updated information.

16. The portable terminal device of claim 11, wherein the information provider comprises an alarm unit to perform an alarm function using sound or vibration when the updated information is determined to exist.

17. The portable terminal device of claim 11, wherein the information provider comprises a transmission unit to transmit the updated information to another device connected to the portable terminal device.

18. The portable terminal device of claim 17, wherein the transmission unit transmits the updated information wired or wirelessly.

19. The portable terminal device of claim 11, further comprising a storage unit to store the updated information.

20. The portable terminal device of claim 19, wherein the storage unit is one or more of a RAM (random-access memory), a hard disk, and a flash memory.

21. The portable terminal device of claim 11, further comprising software programmed to perform the power control.

22. A non-transitory computer-readable medium having embodied thereon a computer program that, when executed by a portable terminal device, cause the portable terminal device to perform the method of claim 1.

* * * * *